United States Patent [19]

van Pelt

[11] 3,948,116
[45] Apr. 6, 1976

[54] SPEED CONTROL GOVERNOR FOR REGULATING THE MAXIMUM SPEED OF INTERNAL-COMBUSTION VEHICLE ENGINES

[75] Inventor: Leendert Willem van Pelt, Nieuwerkerk a/d IJssel, Netherlands

[73] Assignee: Aart Groeneveld, Gorinchem, Netherlands

[22] Filed: May 30, 1974

[21] Appl. No.: 474,687

[52] U.S. Cl. .................... 74/482; 74/481; 74/512; 74/513
[51] Int. Cl.² ......... G05G 11/00; G05G 1/08; G05G 1/14
[58] Field of Search ............ 74/481, 482, 512, 513, 74/479

[56] References Cited
UNITED STATES PATENTS

| | | | |
|---|---|---|---|
| 3,002,397 | 10/1961 | DuShane et al. | 74/482 |
| 3,388,765 | 6/1968 | Sheppard | 74/513 X |
| 3,507,117 | 4/1970 | Lauck | 74/481 X |
| 3,535,951 | 10/1970 | Larson et al. | 74/482 |
| 3,675,731 | 7/1972 | Stopera | 74/513 X |

FOREIGN PATENTS OR APPLICATIONS

| | | | |
|---|---|---|---|
| 1,239,965 | 7/1959 | France | 74/482 |

Primary Examiner—Samuel Scott
Assistant Examiner—P. S. Lall
Attorney, Agent, or Firm—Haseltine, Lake & Waters

[57] ABSTRACT

A speed control governor for regulating the maximum speed of internal-combustion vehicle engines, particularly compression-ignition engines for heavy goods vehicles, the latter having a gear shift mechanism and a fuel supply pump provided with a spindle which regulates the supply of fuel and is connected to a regulating lever which is pivotable upon movement of the vehicle accelerator pedal. An end abutment is provided to limit the maximum movement of the regulating lever to thereby define the angular end position of the fuel pump regulating spindle, and adjusting means are provided which are automatically operated when top gear is selected, the effect being that the angular end position of the regulating spindle of the fuel pump is adjusted from a maximum fuel value to a smaller fuel value when the regulating lever engages the end abutment.

8 Claims, 4 Drawing Figures

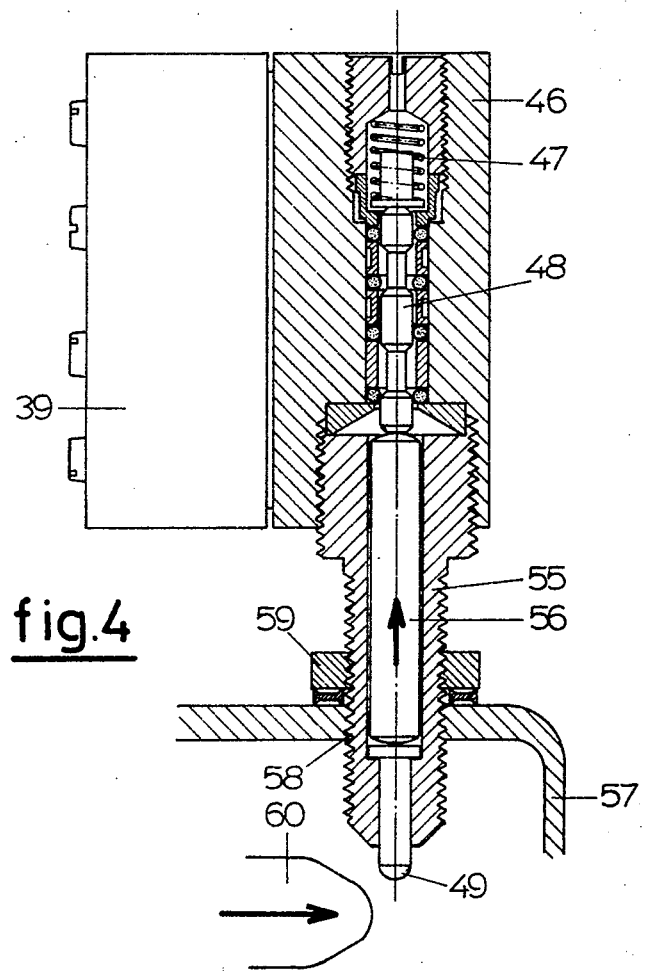

SPEED CONTROL GOVERNOR FOR REGULATING THE MAXIMUM SPEED OF INTERNAL-COMBUSTION VEHICLE ENGINES

BACKGROUND OF THE INVENTION

The invention relates to a speed control governor for vehicle engines, particularly diesel engines for heavy goods vehicles or the like, having a gear shift mechanism and a fuel supply means such as a fuel pump with a spindle which regulates the supply of fuel and is connected to a coupling member which is controlled by the accelerator pedal, an end abutment being provided to limit the maximum movement of the coupling member and thereby define the angular end position of the fuel pump regulating spindle corresponding to maximum engine speed.

In general, diesel engines of heavy goods vehicles or the like have a predetermined maximum speed which can be adjusted to the value desired for any particular engine by adjusting the maximum speed stop for the regulating lever of the fuel pump. This maximum speed can thus be selected so that in the lower gears with the throttle wide open the engine can produce sufficient power to enable the vehicle to be accelerated as much as possible without damaging the engine. If however, when travelling on motorways or the like, the driver fully depresses the accelerator pedal in top gear so that for prolonged periods the engine rotates at the maximum speed of, for example, 2500 r.p.m., then this may lead to increased wear and, under certain circumstances, to serious damage to the engine, quite apart from the fact that driving, when fully laden, at maximum speeds is dangerous and entails an uneconomical fuel consumption. It is therefore highly desirable to ensure that when travelling in top gear the maximum speed of the engine can automatically be set to a lower value of, for example, 2200 r.p.m.

SUMMARY OF THE INVENTION

The invention has for its object to provide a speed control governor of the kind described for automatically resetting the maximum engine speed to a lower limit value when travelling in top gear.

Another object of the invention is to provide a speed control governor of this type which is of simple construction and which can be easily mounted on existing vehicle engines.

According to the present invention the speed control governor comprises adjusting means adapted to reset the angular end position of the fuel pump regulating spindle from the value of maximum engine speed to a selected lower limit value of the engine speed when the coupling member engages the end abutment which adjusting means are operated when top gear of the gear shift mechanism is selected.

In the lower gears the adjusting means is ineffective so that on opening the throttle the regulating spindle of the fuel pump is rotated to the maximum value so that the vehicle can also be accelerated to a maximum. However as soon as the top gear is engaged the adjusting means are operated and ensure that the angular end position of the regulating spindle is such that the maximum engine speed obtainable is lower than in the lower gears.

According to a preferred embodiment of the invention the coupling member comprises a regulating lever having two arms which are angularly displaceable with respect to each other, one arm being adjustable by the accelerator pedal and freely rotatable relative to the regulating spindle of the fuel pump so as to cooperate with the end abutment, whilst the other arm is fixedly connected to the regulating spindle and wherein the adjusting means are mounted between the two arms. A pneumatic or hydraulic control valve which is operated by the gear shift mechanism is preferably provided for controlling the adjusting means.

BRIEF DESCRIPTION OF THE DRAWINGS

In order that the invention may be fully understood a preferred, exemplary embodiment will now be described with reference to the accompanying drawings, in which:

FIG. 4 is a longitudinal section through a control valve which is inserted in the cover of the gear shift mechanism.

DESCRIPTION OF A PREFERRED EMBODIMENT OF THE INVENTION

Figure 1:
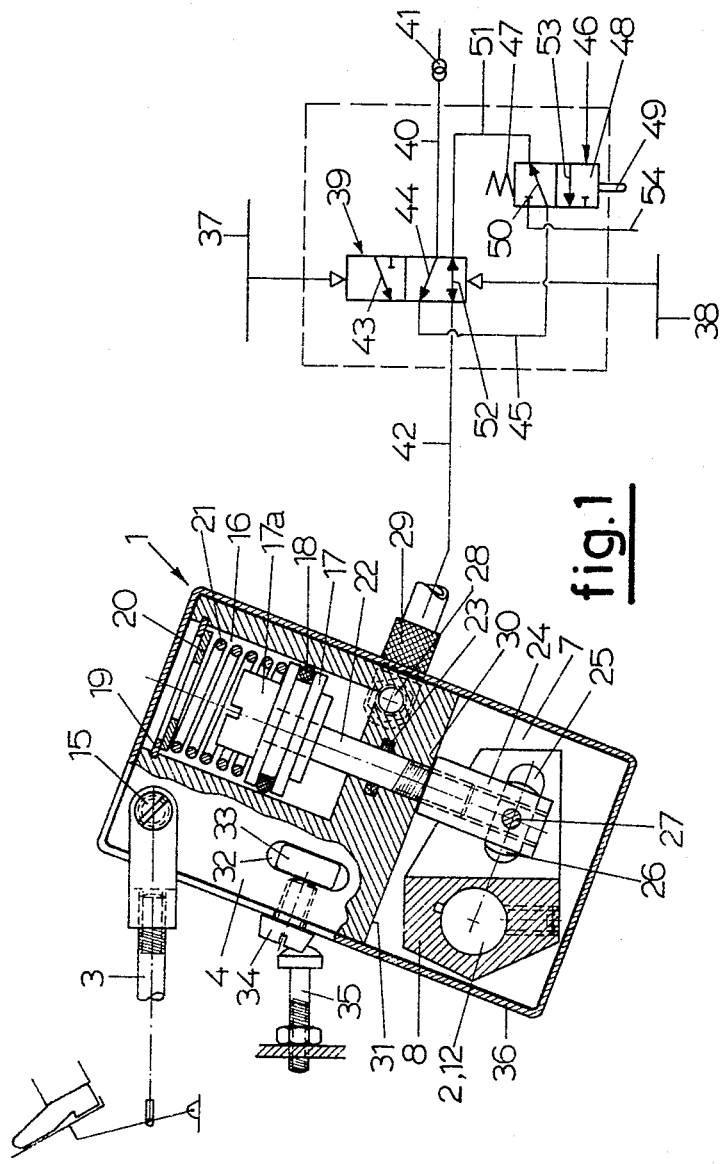
FIG. 1 is a longitudinal section of a speed control governor according to the present invention wherein the pneumatic system is diagrammatically illustrated and the parts of the regulating lever are in the relative position allowing maximum engine speed.
Figure 3:
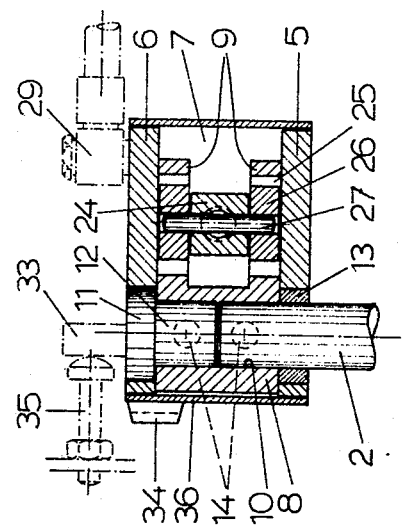
FIG. 3 is a cross-section through FIG. 2 taken along the line III—III.
Figure 2:
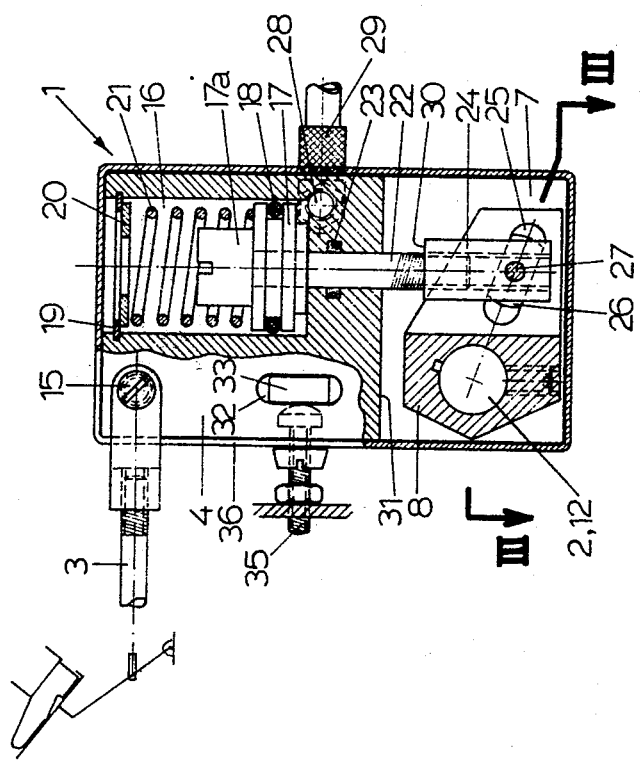
FIG. 2 is a longitudinal section, similar to FIG. 1, but showing the parts of the regulating lever positioned for limited top engine speed.

The speed control governor according to the invention as illustrated in FIGS. 1, 2 and 3 has a regulating lever generally indicated at 1 attached to a regulating spindle 2 (FIG. 3) of a conventional fuel pump (not shown) of a vehicle diesel engine and also coupled to the accelerator pedal of the vehicle by a rod 3 so that when the rod 3 is moved to the left in FIG. 1 the fuel supply is increased.

This regulating lever 1 has a housing in the form of a metal block 4 on the underside of which is provided a slot 7 which extends between two side walls 5 and 6. A forked arm 8 having two fork members 9 is inserted in this slot 7 and has a full length transverse bore 10 in its main body. An enlarged head 11 of a short spindle 12 is rotatably positioned in a bore of the side wall 6, with the spindle 12 projecting halfway into the bore 10 of the arm 8. In the opposite side wall 5, a steel ring 13 is inserted in a bore positioned co-axially with the spindle 12, the internal diameter of the ring being the same as the bore 10 and the ring itself serving to position the regulating spindle 2 of the fuel pump which is inserted into the bore 10 of the arm 8 through the ring 13.

The arm 8 is then firmly fixed on both the spindle 12 and regulating spindle 2 of the fuel pump by means of clamping screws 14. Consequently, the block 4 can be rotated about the regulating spindle 2 of the fuel pump and pivoted relative to the arm 8 firmly mounted on this spindle 2. On the upper side, the rod 3 leading to the accelerator pedal is rotatably connected to the block 4 by means of a bolt 15 screwed into the block 4 so that the latter forms a second arm of the regulating lever 1 between the regulating spindle 2 and the bolt 15.

The block 4 has a cylinder bore 16 in which a piston 17 with a sealing ring 18 is slidably mounted. A compression spring 21 is inserted between the upper side of the piston 17 and an end ring 19 inserted in an annular groove of the cylinder wall and having an abutting washer 20. The compression spring urges the piston downwards to an inner position in which the lower piston end of smaller cross-section abuts the bottom of the cylinder. The piston 17 supports a piston rod 22 which projects downwardly through a bore in the block 4 provided with a sealing ring 23 and into the slot 7. This piston rod 22 is threaded at its lowermost end by means of which it is screwed in a block 24 which is mounted between the members 9 of the forked arm 8.

The members 9 of the arm 8 are provided with guide slots 25 in which slide members 26 are slidably received. These slide members 26 are connected together and to the block 24 by a cross-pin 27 passing through corresponding transverse bores in these members and this block. On its upper side the piston 17 is provided with a screwhead 17a which can be reached from the upper side of the cylinder bore 16 and by means of which the piston 17 can be turned together with the piston rod 22 so that the piston rod 22 can be screwed further into or out of the block 24. In this way the rest position of the arm 8 relative to the block 4 can be adjustably set, as illustrated in FIG. 2.

The block 4 has a duct 28 which at one end communicates with the bottom of the cylinder bore 16 and at the other end opens out at the side wall of the block 4 where a screw nipple 29 is screwed in for the connection of the duct 28 to a source of compressed air in a manner yet to be described. By supplying compressed air through the nipple 29 and the duct 28 to the cylinder chamber located beneath the piston 17, the piston is forced upwards into the position illustrated in FIG. 1 until the upper abutment surface 30 of the block 24 meets the base surface 31 of the slot 7. During this movement the arm 8 is rotated with respect to the block 4 to a second angular position, the slide members 26 allowing such rotation by sliding in the slots 25 of the members 9 of the forked arm 8. The cylinder 16 together with the piston 17 and the adjustable piston rod 22 thus forms an adjusting means through which the angle between the arm 8 fixedly connected to the regulating spindle 2 of the fuel pump and the block 4 forming the second arm of the regulating lever 1 and rotatably mounted on this spindle can be adjusted between two selected values.

An abutment cams 33 projecting laterally from the block 4 is detachably fastened in a transverse bore 32 of the block 4 by means of a clamping screw 34, which cam may be mounted on either side of the block as required. The abutment cam 33 cooperates with an abutment provided by a setscrew (not shown) against which the cam engages when the accelerator pedal is released and by means of which the idling speed of the engine can be adjusted in a known manner. Furthermore, the abutment cam 33 cooperates with a second setscrew 35 against which the cam engages when the accelerator pedal is fully depressed and by means of which the maximum speed of the engine can be set.

The block 4 supports an annular cap 36 which is fastened by the screw 34 and which seals the slot 7 and the cylinder bore 16 during operation.

FIG. 2 illustrates the end position of the regulating lever 1 when the cylinder 16 is pressureless and the abutment cam 33 engages the abutment 35. It is clear that when in this position the cylinder 16 is pressurized and thus the arm 8 in the block 4 is rotated into the relative position of FIG. 1, the regulating spindle 2 of the fuel pump receives a greater angular deflection of a value corresponding to the relative pivotal movement of the arm 8 so that a higher maximum speed is provided for the engine.

The pneumatic control of the piston 17 in the cylinder 16 is diagrammatically illustrated in FIG. 1. In the exemplary embodiment illustrated, it is assumed that the motor is provided with a shift gear mechanism of known type having eight gears wherein in a conventional manner control air is supplied to the gear shift mechanism through a pressure line 37 when one of the four lower gears is selected and through a pressure line 38 when one of the four higher gears is selected.

A slide valve 39 is arranged between the two pressure lines 37, 38 for operation by the pressure in the one or the other of these lines. The valve 39 is connected on one side to the compressed air source 41 of the vehicle through a line 40 and on the other side to the connector nipple 29 through a line 42. When the pressure line 37 is under pressure and thus one of the four lower gears of the gear shift mechanism is engaged the slide valve 39 occupies a position which is downwards relative to FIG. 1 and in which the line 40 is connected directly to the line 42 through valve port 43 so that the cylinder 16 is likewise pressurized. When the line 38 is under pressure and thus one of the four higher gears of the gear shift mechanism is engaged, the slide valve 39 occupies the position illustrated in FIG. 1 in which the pressure line 40 is connected through valve port 44 to a line 45 which leads to a control valve 46. This control valve 46 is in the form of a slide valve with a valve slide 48 which is under the pressure of a spring 47 (see FIG. 4), and which can be moved upwards against the action of spring 47 by a plunger 49 which projects out of the valve casing. In the position illustrated in FIG. 1 the pressurized line 45 is connected through a port 50 of the control valve 46 to a line 51 which is connected through port 52 of the slide valve 39 to the line 42 leading to the cylinder 16 so that with the slide valve 39 in this position the cylinder 16 is under pressure. However, when the driver changes from seventh to eight gears the plunger 49 is forced upwards in a manner to be yet described whereby the valve slide 48 closes the line 45 and connects the line 51 through port 53 to an air vent 54 leading to the open air. The cylinder 16 is thus ventilated by line 42, port 52, line 51, port 53 and line 54 so that the arm 8 swings from the position illustrated in FIG. 1 back into its position in the block 4 as illustrated in FIG. 2.

As shown in FIG. 4, the two slide valves 46 and 39 are screwed together to form a block. A threaded bush 55 is screwed into the casing of control valve 46, the bore of the bush lying in alignment with the valve slide 48. A plunger 56 is slidably received in the bush 55 and is held under the pressure of the spring 47 between the valve slide 48 and the plunger 49 projecting downwardly out of the bush 55. The threaded bush 55 is screwed into a threaded bore 58 provided in the lid 57 of the gear shift box of the engine and is fastened on the lid by means of a lock nut 59. The threaded bush 55 projects through the lid 57 into the gear shift box a sufficient distance to place the plunger 49 in the path of the shift rail 60 of the gear shift mechanism (not shown) so that when moving this shift rail 60 into the position for the fourth or eighth gear its rounded front end forces the plunger 49 upwards, i.e., into the threaded bush 55 and thus reverses the control valve 46.

Thus when the first to the seventh gear is engaged the cylinder 16 is connected to the pressure line 40 so that the arm 48 of the regulating lever 1 occupies the position illustrated in FIG. 1 in which the maximum speed of for example 2500 r.p.m. for the engine is achieved when the acceleration pedal is fully depressed. However, should the top, i.e., the eighth gear, be engaged, then by the actuation of the control valve 46 the cylinder 16 becomes pressureless so that the arm 8 moves to the position illustrated in FIG. 2 and the maximum speed of the engine is automatically reduced to 2200 r.p.m. for example, wherein the reduction in speed can be controlled by adjusting the screw head 17a.

The governor according to the invention as described above occupies little space and can conveniently be mounted on the engine of a heavy goods vehicle or the like. It is particularly advantageous here that the driver is not able to disengage the speed governor without authority since on undoing the air line 42, for example, the pressure in the cylinder 16 drops to zero and thus a reduced maximum speed automatically occurs. The cap 36 can moreover be readily sealed so that unauthorized access to the screw head 17a for the purpose of adjusting the reduced maximum speed is prevented.

Depending upon the type of shift means in the gear shift mechanism, the pneumatic control means can obviously be constructed in a manner different from that described so long as steps are taken to ensure that the cylinder 16 is relieved of pressure when engaging the top gear.

A modification is possible wherein the adjusting means consisting of the cylinder 16 and piston 17 is not installed directly in the double-armed regulating lever 1, but is incorporated with the abutment 35 in which case the regulating lever would have the normal single-armed design. In such an embodiment, when the cylinder is pressureless (as seen in FIGS. 1 and 2), the stop 35 projects further forward than when the cylinder is under pressure, so that the reduced maximum speed is achieved. Such an arrangement has the advantage that the connection between the accelerator pedal and the regulating spindle of the fuel pump can remain unaltered but in most cases there is not sufficient space for the relevant adjusting means to be satisfactorily housed at the position of the abutment 35.

What is claimed is:

1. A speed control governor for regulating the maximum speed of internal-combustion vehicle engines, particularly for heavy goods vehicles, the latter including a gear-shift mechanism, a fuel-supply pump, a fuel-supply regulating spindle for said pump, a member connected to said spindle and controlled for limited pivotal movement by an accelerator pedal, and an end abutment for said member, to define the angular end position of said spindle and thereby the value of the maximum speed of the engine; the governor comprising, in combination: adjusting means for resetting the end position of said spindle from the maximum engine speed to a lower limit value of the engine speed when said member connected to the spindle engages said abutment; and means for automatically operating said adjusting means when top gear of said gear-shift mechanism is selected.

2. The governor as defined in claim 1, wherein said adjusting means includes regulating lever means mounted on said spindle and including first and second arms; said first arm being mounted on said spindle for free rotation and being connected to said pedal for pivotal movement thereby, and being formed as a block having a slot on one side thereof, said slot being enclosed between two side walls of said block; one of said walls having therein a bore to receive one end of said spindle; said second arm being rotatably positioned in said slot, to be fixedly secured to said one end of the spindle; said first arm having a cylindrical recess and a bore extending from the bottom of said recess to said slot; a piston slidable in said recess, a piston rod connected to said piston and extending through said bore into said slot for connection to said second arm, spring means in said recess, to move said piston against said bottom of the recess; said abutment cooperating with said first arm to limit the pivotal movement of the latter when said pedal is depressed; said first arm having therein passage means communicating with said recess on the side of said piston opposite of said spring; a fluid-pressure source, and fluid-control valve means operable by said gear-shift mechanism; said recess being connectable to said source through said valve means, whereby said piston and thus said second arm are moved against said spring means into a position of maximum fuel supply relative to said first arm when the latter touches said abutment; said valve means being actuated by said gear-shift mechanism when the top gear is selected, to connect a portion of said adjusting means to the atmosphere, whereby said spring means moves said second arm with respect to said first arm to a position of reduced maximum fuel supply.

3. The governor as defined in claim 1, wherein said member connected to the spindle is a coupling member which includes a regulating lever having two arms angularly displaceable with respect to each other; one of said arms being adjustable by said pedal and freely rotatable relative to said spindle, said one arm coooperating with said abutment; the other arm being fixedly connected to said spindle, said adjusting means including a part mounted between said two arms.

4. The governor as defined in claim 3, wherein said part of the adjusting means that is mounted between said two arms is constituted by a cylinder connected to one of said arms; and said adjusting means further includes a piston biased by a spring, movable in said cylinder and connected to the other of said arms; a fluid-pressure source, a fluid-control valve operable by said gear-shift mechanism; said cylinder being conectable to said source through said control valve, whereby said piston and thus said other arm are moved against said spring into a position of maximum fuel supply relative to said one arm; said control valve connecting said cylinder to the atmosphere when the top gear is selected, whereby said spring moves said other arm into a position of reduced maximum fuel supply.

5. The governor as defined in claim 4, wherein said gear-shift mechanism includes a casing and a gear-shift rail movable within said casing; and wherein said control valve is screwed into said casing, said control valve including an actuating member projecting into said casing in the path of said rail, to be actuated thereby when the top gear is selected.

6. The governor as defined in claim 4, wherein said one arm includes a block having a slot on one side; said other arm being rotatably positioned in said slot, and having coaxially with its axis of rotation a first bore connected with an aperture in one of the slot side walls; the end of said spindle being inserted in said first bore, said cylinder being formed in said block with said piston connected to said other arm via a piston rod which extends through said block.

7. The governor as defined in claim 6, wherein said piston rod includes two parts screwed into each other; and wherein said piston has on its side opposite from said piston rod a part engageable by a tool for rotating said piston and thereby adjusting the length of said piston rod.

8. The governor as defined in claim 6, further comprising an abutment member detachably mounted in a second bore of said block and cooperating with said abutment for limiting the maximum speed of the engine.

* * * * *